United States Patent
Zhang et al.

(10) Patent No.: US 11,704,771 B2
(45) Date of Patent: Jul. 18, 2023

(54) TRAINING SUPER-RESOLUTION CONVOLUTIONAL NEURAL NETWORK MODEL USING A HIGH-DEFINITION TRAINING IMAGE, A LOW-DEFINITION TRAINING IMAGE, AND A MASK IMAGE

(71) Applicant: Huawei Technologies Co., Ltd., Shenzhen (CN)

(72) Inventors: Yunchao Zhang, Beijing (CN); Shuai Chen, Beijing (CN); Zhiping Jia, Beijing (CN); Lei Miao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 454 days.

(21) Appl. No.: 16/759,870

(22) PCT Filed: Dec. 1, 2017

(86) PCT No.: PCT/CN2017/114181
§ 371 (c)(1),
(2) Date: Apr. 28, 2020

(87) PCT Pub. No.: WO2019/104705
PCT Pub. Date: Jun. 6, 2019

(65) Prior Publication Data
US 2020/0334789 A1    Oct. 22, 2020

(51) Int. Cl.
*G06T 3/40*  (2006.01)
*H04N 23/69*  (2023.01)

(52) U.S. Cl.
CPC ........ *G06T 3/4053* (2013.01); *G06T 3/4046* (2013.01); *H04N 23/69* (2023.01)

(58) Field of Classification Search
CPC .............. G06N 3/08; G06N 20/00; G06T 2207/20084; G06T 3/4053; G06T 3/4046; H04N 5/23296
See application file for complete search history.

(56) References Cited

U.S. PATENT DOCUMENTS

| 7,187,811 B2 | 3/2007 | Lin et al. |
| 2004/0184657 A1 | 9/2004 | Lin et al. |

(Continued)

FOREIGN PATENT DOCUMENTS

| CN | 103918251 A | 7/2014 |
| CN | 105590094 A * | 5/2016 |

(Continued)

OTHER PUBLICATIONS

XP055545078, Dong, C., et al.,"Learning a Deep Convolutional Network for Image Super-Resolution," Sep. 6, 2014, 16 pages.

(Continued)

*Primary Examiner* — Weiming He
(74) *Attorney, Agent, or Firm* — Conley Rose, P.C.

(57) ABSTRACT

An image processing method and a device, where the image processing method is performed by a terminal having a digital zoom function, and the method includes determining a target zoom magnification based on a selection input of a user, collecting a to-be-processed image, and processing the to-be-processed image using a target super-resolution convolutional neural network model to obtain a processed image corresponding to the target zoom magnification, where the target super-resolution convolutional neural network model is obtained by training a super-resolution convolutional neural network model using a high-definition training image, a low-definition training image, and a mask image.

20 Claims, 5 Drawing Sheets

(56) References Cited

U.S. PATENT DOCUMENTS

2012/0092525 A1    4/2012  Kusaka
2014/0232907 A1*  8/2014  Endo .................. G02B 7/12
                                                    348/240.1

FOREIGN PATENT DOCUMENTS

| CN | 106683048 A | | 5/2017 | |
|---|---|---|---|---|
| CN | 106910161 A | | 6/2017 | |
| CN | 107358575 A | | 11/2017 | |
| CN | 107358576 A | | 11/2017 | |
| CN | 108133456 A | * | 6/2018 | ........... G06T 3/4053 |
| EP | 2779625 A1 | | 9/2014 | |
| JP | 2019096146 A | * | 6/2019 | |

OTHER PUBLICATIONS

XP055725732, Peyrard, C., "Single image super-resolution based on neural networks for text and face recognition," Sep. 29, 2017, 188 pages.

Dong, C , et al., "Accelerating the Super-Resolution Convolutional Neural Network," European Conference on Computer Vision. Springer International Publishing, Aug. 2016, pp. 391-407.

\* cited by examiner

TRAINING SUPER-RESOLUTION CONVOLUTIONAL NEURAL NETWORK MODEL USING A HIGH-DEFINITION TRAINING IMAGE, A LOW-DEFINITION TRAINING IMAGE, AND A MASK IMAGE

CROSS-REFERENCE TO RELATED APPLICATIONS

This application is a U.S. National Stage of International Patent Application No. PCT/CN2017/114181 filed on Dec. 1, 2017, which is hereby incorporated by reference in its entirety.

TECHNICAL FIELD

Embodiments of this application relate to image processing technologies, and in particular, to an image processing method and a device.

BACKGROUND

Image super-resolution (Super-Resolution) refers to improving resolution of an original image by using a hardware or software method. Common software super-resolution methods include a conventional non-learning linear interpolation algorithm and a deep neral network leaning-based super-resolution interpolation algorithm.

With continuous development of a deep neural network, the deep neural network leaning-based super-resolution interpolation algorithm has been widely used. The deep neural network leaning-based super-resolution interpolation algorithm usually includes processes such a training data collection, neural network model training, and test data forward calculation. Training data includes high-definition training data and low-definition training data. The low-definition training data is collected by downsampling high-definition training data. A neural network model obtained by training the high-definition training data and the low-definition training data is directly applied to digital zoom of a mobile terminal.

However, in an actual photographing process, a camera of the mobile terminal inevitably has a large quantity of noise, especially on some flat surfaces. A specific implementation of collecting the low-definition training data amplifies image noise. When a neural network model obtained by using the low-definition training data is applied to the mobile terminal, definition of a zoomed image output by the mobile terminal is relatively low, and image quality is poor.

SUMMARY

Embodiments of this application provide an image processing method and a device, to overcome image quality deterioration problems such as definition decrease and noise amplification that are caused by conventional digital zoom.

According to a first aspect, an embodiment of this application provides an image processing method, performed by a terminal having a digital zoom function. The method includes: enabling a photographing function of the terminal; enabling a zoom function of the terminal; receiving a selection input of a user, determining a target zoom magnification based on the selection input of the user, and collecting a to-be-processed image; processing the to-be-processed image by using a target super-resolution convolutional neural network model, to obtain a processed image corresponding to the target zoom magnification, where the target super-resolution convolutional neural network model is obtained by training a super-resolution convolutional neural network model by using a high-definition training image, a low-definition training image, and a mask image; and displaying the processed image.

In this implementation, the target super-resolution convolutional neural network model is used to process the to-be-processed image, to output the processed image. Because the target super-resolution convolutional neural network model is obtained by adjusting the model by continuously teaming based on the high-definition training image, the low-definition training image, and the mask image, definition of a zoomed image output by a model application device can be improved, to overcome image quality deterioration problems such as definition decrease and noise amplification that are caused by conventional digital zoom.

With reference to the first aspect, in one possible implementation of the first aspect, the terminal stores a target super-resolution convolutional neural network model that has at least one single magnification, and the processing the input image by using a target super-resolution convolutional neural network model, to output a processed image includes: determining whether there is a target super-resolution convolutional neural network model whose magnification is equal to the target zoom magnification in the target super-resolution convolutional neural network model that has the at least one single magnification; and if there is a target super-resolution convolutional neural network model whose magnification is equal to the target zoom magnification, processing the to-be-processed image by using the target super-resolution convolutional neural network model whose magnification is equal to the target zoom magnification, and outputting a processed image: or if there is not a target super-resolution convolutional neural network model whose magnification is equal to the target zoom magnification, processing the to-be-processed image by using a Y-magnification target super-resolution convolutional neural network model, to obtain an intermediate result, and performing (X-Y)x zoom on the intermediate result by using a linear interpolation algorithm, to output a processed image, where X is the target zoom magnification, and Y is a maximum zoom magnification that is less than X and that is in the plurality of single magnifications.

In this implementation, when the terminal stores the target super-resolution convolutional neural network model that has the at least one single magnification, a target super-resolution convolutional neural network model whose single magnification is equal to or close to the target zoom magnification is selected to process the to-be-processed image, so that definition of an output zoomed image can be improved, to overcome the image quality deterioration problems such as definition decrease and noise amplification that are caused by the conventional digital zoom.

With reference to the first aspect or one possible implementation of the first aspect, in another possible implementation of the first aspect, the terminal stores a target super-resolution convolutional neural network model that has a plurality of magnifications, and the processing the input image by using a target super-resolution convolutional neural network model, to output a processed image includes: determining whether the plurality of magnifications include the target zoom magnification; and if the plurality of magnifications include the target zoom magnification, inputting the to-be-processed image into the target super-resolution convolutional neural network model, and processing the to-be-processed image by using the target super-resolution convolutional neural network model, to output a processed image or if the plurality of magnifications do not include the target zoom magnification, processing the to-be-processed image by using the target super-resolution convolutional neural network model, to obtain en intermediate result, and performing (X-Z)x zoom on the intermediate result by using a linear interpolation algorithm, to output a processed image, where X is the target zoom magnification, and Z is a maximum zoom magnification that is less than X and that is in the plurality of magnifications.

In this implementation, when the terminal stores the target super-resolution convolutional neural network model that has the plurality of magnifications, the target super-resolution convolutional neural network model that has the plurality of magnifications d the linear interpolation algorithm are used to process the to-be-processed image with reference to the linear interpolation algorithm, so that definition of a output zoomed image can be improved, to overcome the image quality deterioration problems such a definition decrease and noise amplification that are caused by the conventional digital zoom.

With reference to my one of the first aspect or the possible implementations of the first aspect, in mother possible implementation of the first aspect, the method further includes: constructing, by using an image registration algorithm, a training image pair of the high-definition training image and the low-definition training image that are photographed for a same scenario: extracting an area of interest in the high-definition training image according to a preset rule, and separately assigning different weights to the area of interest and the other areas in the high-definition training image, to generate the mask image that has a same size as the high-definition training image, and inputting the high-definition training image, the low-definition training image, and the mask image into a super-resolution convolutional neural network model, calculating a loss cost result in each area based on different weights stored in the mask image, and obtaining the target super-resolution convolutional neural network model based on the loss cost result.

In this implementation, in a learning process, because the mask image is input, the weight of the area of interest is relatively high, and the loss cost result is greatly affected. Therefore, a learning rate of the area of interest can be improved, and a learning rate of the other areas can be reduced, to effectively improve a image processing effect of the obtained target super-resolution convolutional neural network model. The target super-resolution convolutional neural network model is applied to the model application device, to improve the definition of the zoomed image output by the model application device.

With reference to my one of the first aspect or the possible implementations of the first aspect, in another possible implementation of the rust aspect, the obtaining the target super-resolution convolutional neural network model based on the loss cost result includes: determining whether the loss cost result meets a preset condition; and if the loss cost result does not meet the preset condition, adjusting the super-resolution convolutional neural network model until an adjusted super-resolution convolutional neural network model meets the preset condition, to obtain the target super-resolution convolutional neural network model; or if the loss cost result meets the preset condition, using the super-resolution convolutional neural network model a the target super-resolution convolutional neural network model.

In this implementation, the super-resolution convolutional neural network model is adjusted based on the loss cost result, to effectively improve an image processing effect of the obtained target super-resolution convolutional neural network model.

With reference to any one of the first aspect or the possible implementations of the first aspect, in another possible implementation of the first aspect, the extracting an area of interest in the high-definition training image according to a preset rule includes: extracting high-frequency information in the high-definition training image by using a high-frequency extraction algorithm, and using the high-frequency information as the area of interest; or extracting face information in the high-definition training image by using a face detection algorithm, md using the face information as the area of interest or extracting different objects as the area of interest by using image segmentation algorithm.

In this implementation, area (for example, an image edge) in which the high-frequency information is located is used as the area of interest. A model training process may improve a learning rate of the area (for example, the image edge) in which the high-frequency information is located, so that a edge of an output image of the target super-resolution convolutional neural network model is sharper, and user subjective perception is good. However, the model training process may improve a leaning rate of an area (a flat area, noise, or the like) in which low-frequency information is located, so that there is no obvious noise amplification for the output image of the target super-resolution convolutional neural network model, to implement noise equalization.

With reference to the first aspect or one possible implementation of the first aspect, in another possible implementation of the first aspect, the method further includes: receiving a photographing command used for input by a user by using a camera operation screen or a hardware photographing button, and saving the processed image in a memory of the terminal in response to the photographing instruction.

In this implementation, the processed image may be saved in the memory of the terminal according to the photographing command used for input, to meet a user requirement.

With reference to the first aspect or one possible implementation of the first aspect, in another possible implementation of the first aspect, the processing the to-be-processed image by using a target super-resolution convolutional neural network model includes: when the target zoom magnification is greater than a maximum optical zoom magnification of the terminal, processing the to-be-processed image by using the target super-resolution convolutional neural network model.

In this implementation, it can be determined whether the target zoom magnification is greater than the maximum optical zoom magnification of the terminal. When the target zoom magnification is greater than the maximum optical zoom magnification of the terminal, the target super-resolution convolutional neural network model is used to process the to-be-processed image, so that during digital zoom, the terminal processes the to-be-processed image by using the target super-resolution convolutional neural network model.

According to a second aspect, a embodiment of this application provides a image processing method, including: photographing a high-definition training image and a low-definition training image for a same scenario; extracting an area of interest in the high-definition training image according to a preset rule, and separately assigning different weights to the area of interest and the other areas in the high-definition training image, to generate a mask image that has a same size as the high-definition training image; and training a super-resolution convolutional neural network model by using the high-definition training image, the low-definition training image, and the mask image, to generate a target super-resolution convolutional neural network model.

In this implementation, the super-resolution convolutional neural network model is trained by inputting the high-definition training image, the low-definition training image, and the mask image, so that the super-resolution convolutional neural network model may adjust the model by continuously learning based on the high-definition training image, the low-definition training image, and the mask image, to obtain the target super-resolution convolutional neural network model. In a learning process, because the mask image is input, the weight of the area of interest is relatively high, and a loss cost result is greatly affected. Therefore, a learning rate of the area of interest can be improved, and a learning rate of the other areas can be reduced, to effectively improve an image processing effect of the obtained target super-resolution convolutional neural network model. The target super-resolution convolutional neural network model is applied to a model application device, to improve definition of a zoomed image output by the model application device.

With reference to the second aspect, in one possible implementation of the second aspect, the extracting an area of interest in the high-definition training image according to a preset rule includes: extracting high-frequency information in the high-definition training image by using a high-frequency extraction algorithm, and using the high-frequency information as the area of interest; or extracting face information in the high-definition training image by using a face detection algorithm, and using the face information as the area of interest; or extracting different objects as different areas of interest by using a image segmentation algorithm.

With reference to the second aspect or one possible implementation of the second aspect, in another possible implementation of the second aspect, the training a super-resolution convolutional neural network model by using the high-definition training image, the low-definition training image, and the mask image, to generate a target super-resolution convolutional neural network model includes: inputting the high-definition training image, the low-definition training image, and the mask image into a super-resolution convolutional neural network model, calculating a loss cost result in each area based on different weights stored in the mask image, ad obtaining the target super-resolution convolutional neural network model based on the loss cost result.

With reference to my one of the second aspect or the possible implementations of the second aspect, in another possible implementation of the second aspect, the inputting the high-definition training image, the low-definition training image, and the mask image into a super-resolution convolutional neural network model, calculating a loss cost result in each area based on different weights stored in the mask image, and obtaining the target super-resolution convolutional neural network model based on the loss cost result includes: processing the low-definition training image by using the super-resolution convolutional neural network model, to obtain a high-definition image output by a network; performing an operation on the high-definition training image, the high-definition image output by the network, and the mask image, to calculate a loss cost result: and obtaining the target super-resolution convolutional neural network model based on the loss cost result.

With reference to my one of the second aspect or the possible implementations of the second aspect, in another possible implementation of the second aspect, the obtaining the target super-resolution convolutional neural network model based on the loss cost result includes: determining whether the loss cost result meets a preset condition; and if the loss cost result does not meet the preset condition, adjusting the super-resolution convolutional neural network model until an adjusted super-resolution convolutional neural network model meets the preset condition, to obtain the target super-resolution convolutional neural network model; or if the loss cost result meets the preset condition, using the super-resolution convolutional neural network model a the target super-resolution convolutional neural network model.

With reference to my one of the second aspect or the possible implementations of the second aspect, in another possible implementation of the second aspect, the performing a operation on the high-definition training image, the high-definition image output by the network, and the mask image, to calculate a loss cost result includes:

obtaining the loss cost result according to a formula $$\text{Loss} = \frac{1}{2} \Sigma_{l=1}^{L} y_{mask} \| y_{train_{hr}} - y_{nn\_hr} \|_2^2, \text{ wherein}$$

LOSS is the loss cost result, L is a pixel quantity, $y_{mask}$ is a weight of the mask image, $y_{train_{hr}}$ is a grayscale value or a brightness value of a pixel of the high-definition training image, and $y_{nn\_hr}$ is a grayscale value or a brightness value of the high-definition image output by the network.

With reference to my one of the second aspect or the possible implementations of the second aspect, in another possible implementation of the second aspect, the method further includes:

registering the high-definition training image and the low-definition training image by using an image registration algorithm, to establish a one-to-one correspondence between the high-definition training image and the low-definition training image.

According to a third aspect, an embodiment of this application provides a terminal, including a display, a camera, a processor, and a memory.

The camera is configured to photograph an image, the memory is configured to store computer-executable program code, and the program code includes an instruction. When the processor executes the instruction, the instruction enables the terminal to perform the image processing method according to my possible implementation of the first aspect.

According to a fourth aspect, a embodiment of this application provides a training server, including a processor and a memory.

The memory is configured to store computer-executable program code, and the program code includes an instruction. When the processor executes the instruction, the instruction enables the training server to perform the image processing method according to my possible implementation of the second aspect.

According to a fifth aspect, an embodiment of this application provides a computer storage medium. The computer storage medium stores a computer program or instruction. When the computer program or instruction is executed by a processor or a computer, the image processing method according to any possible implementation of the first aspect or the second aspect is implemented.

According to the image processing method and the device in the embodiments of this application, the target super-resolution convolutional neural network model is used to process the to-be-processed image, to output the processed image. Because the target super-resolution convolutional neural network model is obtained by adjusting the model by continuously learning based on the high-definition training image, the low-definition training image, and the mask image, the definition of the zoomed image output by the model application device can be improved, to overcome image quality deterioration problems such as definition decrease and noise amplification that are caused by conventional digital zoom.

BRIEF DESCRIPTION OF DRAWINGS

The following briefly describes the accompanying drawings required for describing embodiments or the prior art.

DESCRIPTION OF EMBODIMENTS

Figure 1:
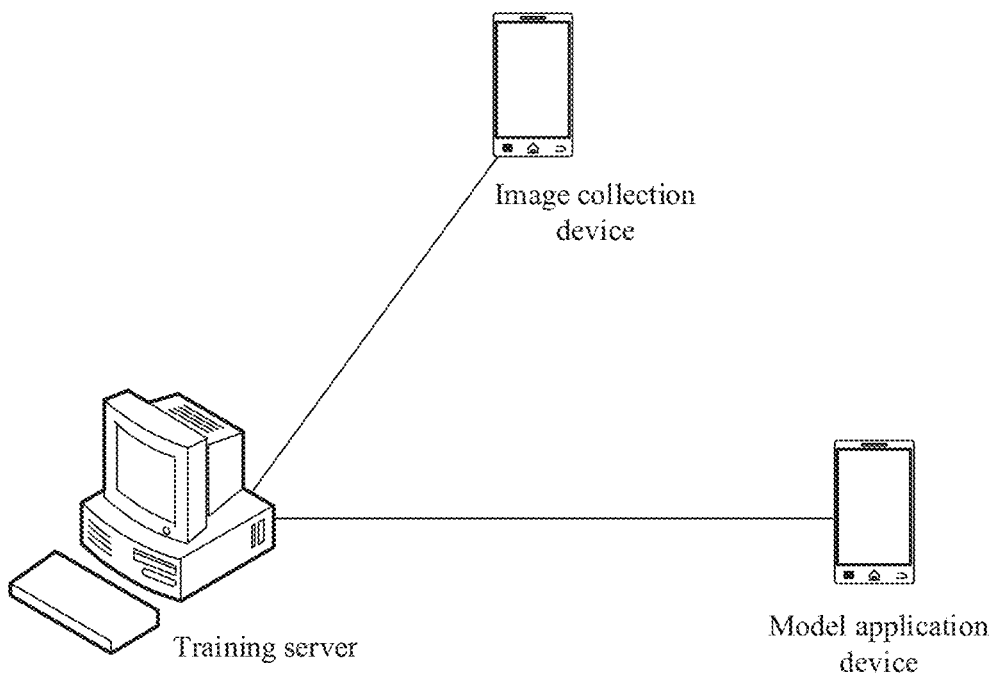
FIG. 1 is a schematic diagram of an application scenario according to this application.

In the following, some terms in this application we described, to help persons skilled in the art have a better understanding.

A terminal may be a wireless terminal or a wired terminal. The wireless terminal may refer to a device that provides a user with voice and/or other service data connectivity, a handheld device with a radio connection faction, or another processing device connected to a radio modem. The wireless terminal may communicate with one or more core networks through a radio access network (Radio Access Network, RAN). The wireless terminal may be a mobile terminal, such as a mobile phone (also referred to as a "cellular" phone) mad a computer with a mobile terminal, for example, may be a portable, pocket-sized, handheld, computer built-in, or vehicle-mounted mobile apparatus, which exchanges voice and/or data with the radio access network. For example, the wireless terminal may be a device such as a personal communication service (Personal Communication Service, PCS) phone, a cordless telephone set, a session initiation protocol (Session Initiation Protocol, SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile terminal (Mobile), a remote station (Remote Station), a remote terminal (Remote Terminal), a access terminal (Access Terminal), a user terminal (User Terminal), a user agent (User Agent), a user device (User Device or User Equipment). This snot limited herein.

A camera of the terminal may be a front-facing camera or a rear-facing camera of the terminal.

An image collection device may be a terminal configured to collect a training image. The image collection device includes a front-facing camera and/or a rear-facing camera. When the image collection device is in a operation mode, for example, a photographing mode, the front-facing camera and/or the rear-facing camera may perform photographing, to obtain the training image. Each of the front-facing camera md the rear-facing camera may be a optical lens system that has a digital zoom capability but has a fixed focal length, or may be an optical zoom system that ha optical zoom capability. For a specific process of collecting the training image, refer to specific descriptions in the following embodiments.

A training server may train a super-resolution convolutional neural network model by using a training image collected by the image collection device. The training server includes a processor, a hard disk, a memory, a system bus, and the like. The super-resolution convolutional neural network model in this application specifically refer to a convolutional neural network model used to implement super-resolution, and implementing super-resolution specifically refers to improving resolution of an original image.

A model application device may be a terminal that stores a super-resolution convolutional neural network model. The super-resolution convolutional neural network model may be obtained by the training server by performing training. The model application device may specifically be any one of the foregoing specific terminals.

A model in this application specifically is a data mining model, for example, a neural network model. The neural network model may be a convolutional neural network model or the like. In the embodiments of this application, the foregoing super-resolution convolutional neural network model is used as en example for description. This is not limited in this application. The super-resolution convolutional neural network model includes a plurality of convolutional layers and fully connected layers, where a weight parameter and a bias term parameter are used to represent the super-resolution convolutional neural network model. Different super-resolution convolutional neural network models have different weight parameters and bin term parameters, and have different processing performance.

A training process of the super-resolution convolutional neural network model specifically refers to adjusting a weight parameter and a bias term parameter of the model by learning training data, so that an output of the neural network model is as close as possible to a target value. For ample, the target value is a high-definition training image described below.

It should be noted that for the super-resolution convolutional neural network model in this application, refer to a super-resolution convolutional neural network model in the prior art. A difference between this application and the prior art lies in that the super-resolution convolutional neural network model is trained in the following embodiments, to obtain a target super-resolution convolutional neural network model. "Adjusting a super-resolution convolutional neural network model" in the embodiments of this application refers to adjusting a weight parameter and a bias term parameter.

A training image may be classified into a high-definition training image and a low-definition training image. A high-definition training image is obtained when an image collection device uses short-distance small-magnification zoom, and a low-definition training image is obtained when the image collection device uses long-distance large-amplification zoom. Both a distance and a zoom magnification are relative, for example, an image collected by using 1× zoom at a distance of 1 meter may be used as the high-definition training image, and an image collected by using 2× zoom at a distance of 2 meters may be used a the low-definition training image. For another ample, if a image collected by using 1× zoom at a distance of 1 meter may be used as the high-definition training image, an image collected by using N× zoom at a distance of N meters may be used as the low-definition training image. A value range of N is related to a maximum optical zoom magnification of the image collection device. Specifically, N is any number greater than the maximum optical zoom magnification of the image collection device. It can be learned that the low-definition training image is a image collected when the image collection device is in digital zoom. For example, if the maximum optical zoom magnification of the image capture device is 2, the value range of N is N>2. It should be noted that N may be a integer, or may be a decimal. Specifically, N may be flexibly selected according to a requirement. It should be further noted that if the image collection device does not have an optical zoom capability, the maximum optical zoom magnification of the image collection device may be considered as 1.

A zoom magnification usually refers to a change amount of an imaging angle range that is correspondingly changed by a image collection device carrying a optical zoom lens by adjusting a focus distance. Similarly, in a image collection device that does not include an optical zoom lens, the zoom magnification usually refers to magnifying a size of a collected image at a corresponding magnification by using a digital zoom method such as image interpolation. To be specific, the zoom magnification may be classified into en optical zoom magnification md a digital zoom magnification. A zoom magnification of a high-definition training image is the optical zoom magnification, and a zoom magnification of a low-definition training image is the digital zoom magnification.

Training data includes one or more groups of training images, and each group of training images are obtained by photographing a same scenario and in different photographing conditions. The training data is data used to train a data mining model in a data mining process. In the embodiments of this application, the training data is used to train a super-resolution convolutional neural network model. The photographing condition specifically includes a photographing distance and a zoom magnification. The photographing distance specifically refers to a distance between an image collection device and a target object in the scenario. A condition for meting a photographing distance specifically means that the photographing distance is equal to 1 meter, 2 meters, . . . , or N meters, and a condition of meeting a zoom magnification specifically means that the zoom magnification is equal to 1, 2, . . . , or N. N is any number greater than a maximum optical zoom magnification of the image capture device. For a specific process of constructing the training data, refer to specific descriptions in the following embodiments.

A scenario in this application specifically refers to a photographing scenario. To be specific, a image collection device in this application is used to photograph the scenario, to collect a training image. Training images of a sane scenario may form a group of training images.

In this application, "a plurality of" refers to two or more than two. The term "and/or" describes a association relationship of associated objects and represents that three relationships may exist. For example, A and/or B may represent the following three cases: Only A exists, both A and B exist, and only B exists. The character "/" generally indicates a "or" relationship between the associated objects.

FIG. 1 is a schematic diagram of a application scenario according to this application. As shown in FIG. 1, the application scenario includes an image collection device, a training server, and a model application device. The image processing method in this application includes: collecting, in an image collection phase, a high-definition training image and a low-definition training image by using an image collection device, and training, in a training phase, a super-resolution convolutional neural network model by using the high-definition training image and the low-definition training image that are collected by the image collection device and using a mask leaning training method, to obtain a target super-resolution convolutional neural network model; and storing the target super-resolution convolutional neural network model in the model application device, enabling, by the model application device, a camera zoom function to collect an image, processing the collected image by using the target super-resolution convolutional neural network model, and outputting a processed image, where the enabling a camera zoom function to collect an image specifically means that a camera collects the image at a digital zoom magnification, and the digital zoom magnification may be any number greater than 2.

It may be understood that the image collection device, the training server, and the model application device may be three separate devices or one terminal, the image collection device and the training server may be one terminal, or the training server and the model application device may be one terminal. This is not limited in this application.

Therefore, it should be noted that a zoom magnification related to the model application device in this application is usually a digital zoom magnification.

The following separately describes specific implementation processes of image collection and model training.

(1) Image Collection

Figure 2:
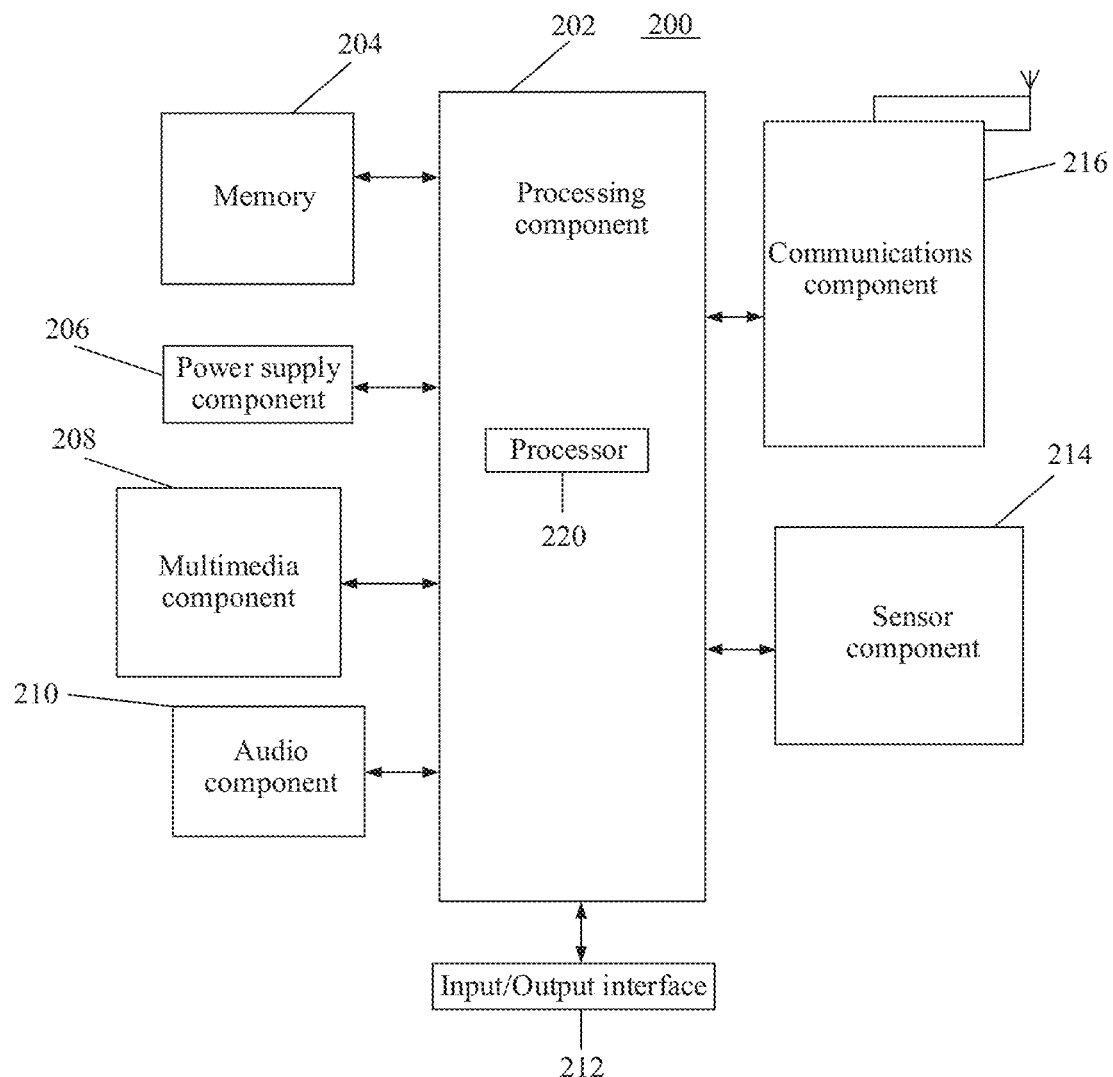
FIG. 2 is a schematic diagram of a structure of an image collection device according to this application.

FIG. 2 is a schematic diagram of a structure of an image collection device according to this application. As shown in FIG. 2, the image collection device 200 may include one or more of the following components: a processing component 202, a memory 204, a power supply component 206, a multimedia component 208, an audio component 210, a input/output (I/O) interface 212, and a sensor component 214, and a communications component 216.

The processing component 202 generally controls an overall operation of the image collection device 200, such as displaying, calling, data communication, camera operation, and recording. The processing component 202 may include one or more modules, to facilitate interaction between the processing component 202 and another component. For example, the processing component 202 may include a multimedia module, to facilitate interaction between the multimedia component 208 and the processing component 202.

The multimedia component 208 may include a touchscreen. In some embodiments, the touchscreen may include a liquid crystal display (LCD) and a touch panel (TP). The touch panel includes one or more touch sensors to sense touching, sliding, and a gesture on the touch panel. The touch sensor may not only sense a boundary of a touch action or a slide action, but also detect duration and a pressure related to the touch operation or the slide operation. The multimedia component 20 may further include a front-facing camera and/or a rear-facing camera. When the image collection device 200 is in a operation mode, for example, a photographing mode or a video mode, the front-facing camera and/or the rear-facing camera may photograph multimedia data. Each of the front-facing camera ad the rear-facing camera may be a optical lens system that has only a digital zoom capability but has a fixed optical focal length, or may be a optical zoom system that ha an optical zoom capability.

The memory 204 may store various types of data to support operations on the image capture device 200. For example, such data includes an instruction used for any application program or method to be operated on the image collection device 200, contact data, phonebook data, a message, a picture, a video, and the like. The memory 204 may be implemented by any type of volatile or non-volatile storage device or a combination thereof, such as a static random access memory (SRAM), a electrically erasable programmable read-only memory (EEPROM), an erasable programmable read-only memory (EPROM), a programmable read-only memory (PROM), a read-only memory (ROM), a magnetic memory, a flash memory, a magnetic disk, or a optical disc.

An image collection process in this application may specifically be as follows: The image collection device 200 photographs a scenario by using the front-facing camera and/or the rear-facing camera, stores an image obtained by photographing in the memory, and then sends the image obtained by photographing to a training server by using the communications component 216. A format of the image nay be a bmp format, a jpg format, a jpeg format, or the like. A specific format may be flexibly set according to a requirement.

The image collection device 200 may collect a high-definition training image by using optical zoom, and may collect a low-definition training image by using digital zoom.

In a implementation, the image collection device 200 has a digital zoom capability but does not have a optical zoom capability. The image collection device 200 collects a high-definition training image by using 1× optical zoom at a distance of 1 meter. In other words, a image collected by using 1× optical zoom at the distance of 1 meter is used a the high-definition training image. The image collection device 200 collects a low-definition training image by using the digital zoom capability of the image collection device. For example, the image collection device collects the low-definition training image by using 2× digital zoom at a distance of 2 meters. In other words, an image collected by using 2× digital zoom at the distance of 2 meters is used as the low-definition training image.

In another implementation, the image collection device 200 has both the digital zoom capability and the optical zoom capability (for example, a maximum of 2× optical zoom). The image collection device 200 may collect a high-definition training image by using 1× optical zoom at a distance of 1 mete In other words, an image collected by using 1× optical zoom at a distance of 1 meter is used as the high-definition training image. Alternatively, the image collection device 200 may collect a high-definition training image by using 2× optical zoom at a distance of 2 meters. In other words, an image collected by using 2× optical zoom at the distance of 2 meters is used as the high-definition training image, and this may be flexibly set according to a requirement. The image collection device 200 collects a low-definition training image by using the digital zoom capability of the image collection device. For example, the image collection device collects a low-definition training image by using N× digital zoom at a distance of N meters. In other words, an image collected by using N× digital zoom at the distance of N meters is used a the low-definition training image.

When the image collection device 200 has both the digital zoom capability and the optical zoom capability (for example, a maximum of 2× optical zoom), definition of the image collected by using 2× optical zoom at the distance of 2 meters is the same as that of image collected by using 1× zoom at the distance of 1 meter, and this may also be referred to as that imaging qualities are the same.

In an implementation, the image collection device 200 may determine a photographing condition according to a training requirement, and collect a training image when the image collection device 200 meets the photographing condition.

The training requirement specifically refers to a type of a super-resolution convolutional neural network model that needs to be obtained after a process of training a super-resolution convolutional neural network model. The super-resolution convolutional neural network model may be a single-magnification or multi-magnification super-resolution convolutional neural network model. A single magnification indicates that a single model supports image zooming in at one zoom magnification. A plurality of magnifications indicate that a single model simultaneously supports image zooming in at a plurality of zoom magnifications.

For example, the super-resolution convolutional neural network model that needs to be obtained is a single-magnification super-resolution convolutional neural network model, and an example in which the magnification is N (for a value range of N, refer to the foregoing descriptions, and details we not described herein again) is used for description. In this case, the image collection device 200 determines two photographing conditions. One photographing condition is that a photographing distance is equal to 1 meter and an optical zoom magnification is equal to 1. The other photographing condition is that the photographing distance is equal to N meters and a digital zoom magnification is equal to N. The image collection device 200 performs photographing when the two photographing conditions are met, to obtain training images. An image whose photographing distance is equal to 1 meter and whose optical zoom magnification is equal to 1 is used as a high-definition training image, and an image whose photographing distance is equal to N meters and whose digital zoom magnification is equal to N is used as a low-definition training image.

For example, the super-resolution convolutional neural network model that needs to be obtained is a multi-magnification super-resolution convolutional neural network model. The plurality of magnifications include m zoom magnifications $\{N_1, N_2, \ldots, N_m\}$, where m is a positive integer greater than 1, a value range of each of the m zoom magnifications is the same as that of N, and different zoom magnifications have different values, for example, $N_1=3$, and $N_2=5$. In this case, the image collection device 200 determines m+1 photographing conditions: a photographing distance is equal to 1 meter and a optical zoom magnification is equal to 1, the photographing distance is equal to $N_1$ meters and a digital zoom magnification is equal to $N_1$, a photographing distance is equal to $N_2$ mete and the digital zoom magnification is equal to $N_2$, . . . , and the photographing distance is equal to $N_m$ meters and the digital zoom magnification is equal to $N_m$. When meeting the (m+1) photographing conditions, the image collection device 200 performs photographing, to obtain training images. An image whose photographing distance is equal to 1 meter and whose optical zoom magnification is equal to 1 is used as a high-definition training image, and the other images we low-definition training images.

It may be understood that the image collection device 200 may store the photographing distances and the zoom magnifications during the photographing, for example, write the photographing distances and the zoom magnifications into attribute information of the images obtained by photographing.

It should be further noted that the image collection device 200 may determine an actual photographing distance by using a distance measurement method in the prior art, so that the image collection device 200 performs photographing when the actual photographing distance meets a photographing distance in a photographing condition. The distance measurement method in the prior art may be laser distance measurement, sound wave distance measurement, or the like.

An example in which the plurality of magnifications include m zoom magnifications $\{N_1, N_2, \ldots, N_m\}$ is used for further description. In a scenario, the image collection device 200 separately collects the following images for a same target object by moving along a radial direction of the target object: an image whose photographing distance is equal to 1 meter and whose optical zoom magnification is equal to 1, an image whose photographing distance is equal to $N_1$ meta ad whose digital zoom magnification is equal to $N_1$, a image whose photographing distance is equal to $N_2$ meters and whose digital zoom magnification is equal to $N_2$, . . . , and an image whose photographing distance is equal to $N_m$ meters and whose digital zoom magnification is equal to $N_m$.

That the image collection device 200 performs image collection means to photograph a scenario in different photographing conditions, to obtain training images.

It should be noted that the image collection device 200 may alternatively photograph a plurality of scenarios in the foregoing photographing conditions, to collect training images. Training images of a same scenario may form a group of training images.

It may be understood that the image collection device 200 may further store a scenario identifier, for example, write the scenario identifier into attribute information of a image obtained by photographing, and the scenario identifier is used to identify a photographing scenario.

For example, the training requirement may further include a function of a model application device. Content of the image obtained by the image collection device 200 by photographing may include a text, a scenery, a person, and the like. In a implementation, content of a image obtained in an image collection phase is related to the function of the model application device. For example, if the model application device is a smartphone, various scenarios such as a text, a scenery, and a person may be photographed in the image collection phase, to obtain a image, and content of the image includes the text, the scenery, the person, md the like. If the model application device is a traffic camera device, scenarios such as a vehicle and a license plate may be photographed in the image collection phase, to obtain an image, and content of the image includes the vehicle, the license plate, and the like.

It should be noted that the foregoing power supply component 206 supplies power to various components of the image collection device 200. The power supply component 206 may include a power management system, one or more power supplies, and other components associated with power generation, management, and distribution for the image collection device 200. The audio component 210 may output and/or input an audio signal. The I/O interface 212 provides an interface between the processing component 202 and a peripheral interface module. The peripheral interface module may be a keyboard, a click wheel, touchscreen, a button, or the like. These buttons may include but are not limited to, a home button, a volume button, a startup button, and a lock button. The sensor component 214 includes one or more sensors, configured to provide various types of state evaluation for the image collection device 200. The communications component 216 is configured to facilitate wired or wireless communication between the image collection device 200 and another device. The image collection device 200 may connect to a communication standard-based wireless network, such as Wi-Fi, 2G, 3G, or a combination thereof. In a example embodiment, the communications component 216 receives a broadcast signal or broadcast-related information from an external broadcast management system by using a broadcast channel. In a example embodiment, the communications component 216 further includes a near field communication (NFC) module to facilitate short-distance communication. For example, the NFC module may be implemented based on a radio frequency identification (RFID) technology, en infrared data association (IrDA) technology, a ultra-wideband (UWB) technology, a Bluetooth (BT) technology, or another technology.

(2) Training Data Selection

Figure 3:
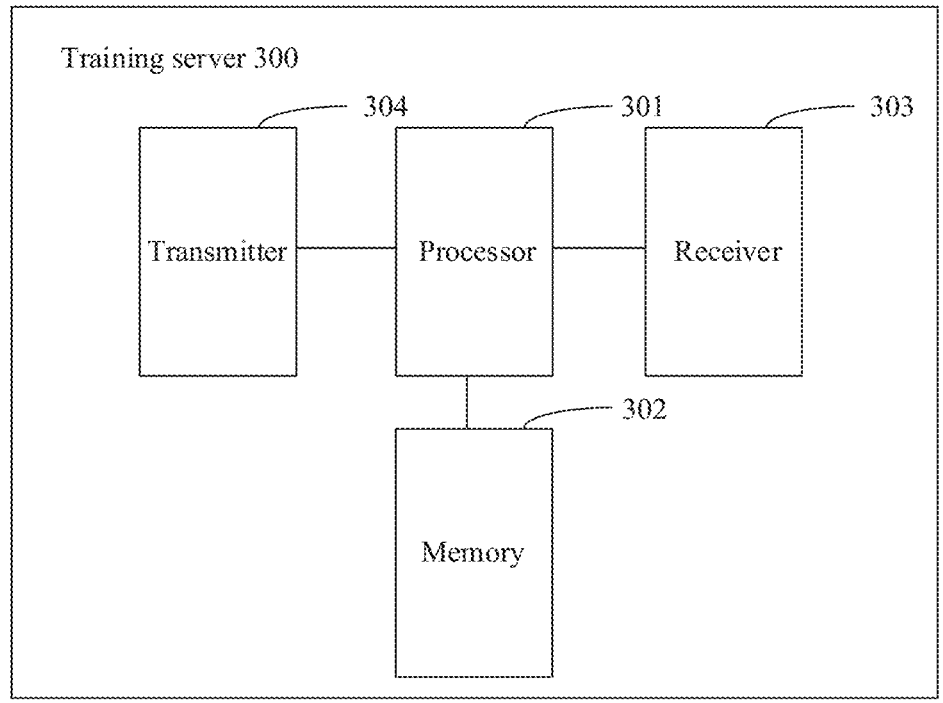
FIG. 3 is a schematic diagram of a structure of a training server according to this application.

FIG. 3 is a schematic diagram of a structure of a training server according to this application. As shown in FIG. 3, the training server 300 may include one or more of the following components: a processor 301, a memory 302, a receiver 303, and a transmitter 304.

The receiver 303 and the transmitter 304 may include a necessary radio frequency communications device such as a mixer. The receiver 303 and the transmitter 304 may alternatively be transceivers. The processor 301 may include at least one of a central processing unit (Central Processing Unit, CPU), a digital signal processor (digital signal processor, DSP), a microcontroller unit (Microcontroller Unit. MCU), ma application-specific integrated circuit (Application Specific Integrated Circuit, ASIC), or a field programmable logic gate array (Field-Programmable Gate Array, FPGA). The memory 302 is configured to store a program instruction, and the processor 301 is configured to invoke the program instruction in the memory 302 to perform a corresponding operation. The program instruction may be implemented in a form of a software factional unit and may be sold or used as an independent product. The memory 302 may be a computer-readable storage medium in may form.

In this embodiment of this application, the receiver 303 may receive an image sent by the image collection device 200, and the processor 301 selects training data based on the received image.

An example in which a super-resolution convolutional neural network model that needs to be obtained is a single-magnification super-resolution convolutional neural network model is used for further description. The processor 301 of the image collection device 200 uses a image whose photographing distance is equal to 1 meter and whose optical zoom magnification is equal to 1 and an image whose photographing distance is equal to N meters and whose digital zoom magnification is equal to N as training data. In other words, the training data includes two images. An image whose photographing distance is equal to 1 meter and whose zoom magnification is equal to 1 is a high-definition training image, and an image whose photographing distance is equal to N meters and whose zoom magnification is equal to N is a low-definition training image. Corresponding to a specific training requirement, an image with a corresponding digital zoom magnification and an image obtained by using 1× zoom at a distance of 1 meter form a image pair, and the image pair is the training data.

Another example in which the super-resolution convolutional neural network model that needs to be obtained is a multi-magnification super-resolution convolutional neural network model and a plurality of magnifications include 3, 5, and 7 is used for description. In this case, the processor 301 of the image collection device 200 uses an image whose photographing distance is equal to 1 meter and whose optical zoom magnification is equal to 1, a image whose photographing distance is equal to 3 meters and whose digital zoom magnification is equal to 3, an image whose photographing distance is equal to 5 meters and whose digital zoom magnification is equal to 5, and an image whose photographing distance is equal to 7 meters and whose digital zoom magnification is equal to 7 as the training data. In other words, the training data includes four images. In the training data, the image whose photographing distance is equal to 1 meter and whose optical zoom magnification is equal to 1 is a high-definition training image, and the other image, are low-definition training image.

The selected training data may include one or more groups of training images, md each group of training images is obtained by photographing a same scenario in different photographing conditions. In this embodiment of this application, a super-resolution convolutional neural network model is trained by using the training data, and a plurality of groups of training images may be used to train one super-resolution convolutional neural network model. For a specific process of training the model, refer to descriptions in the following embodiment.

(3) Model Training

Figure 4:
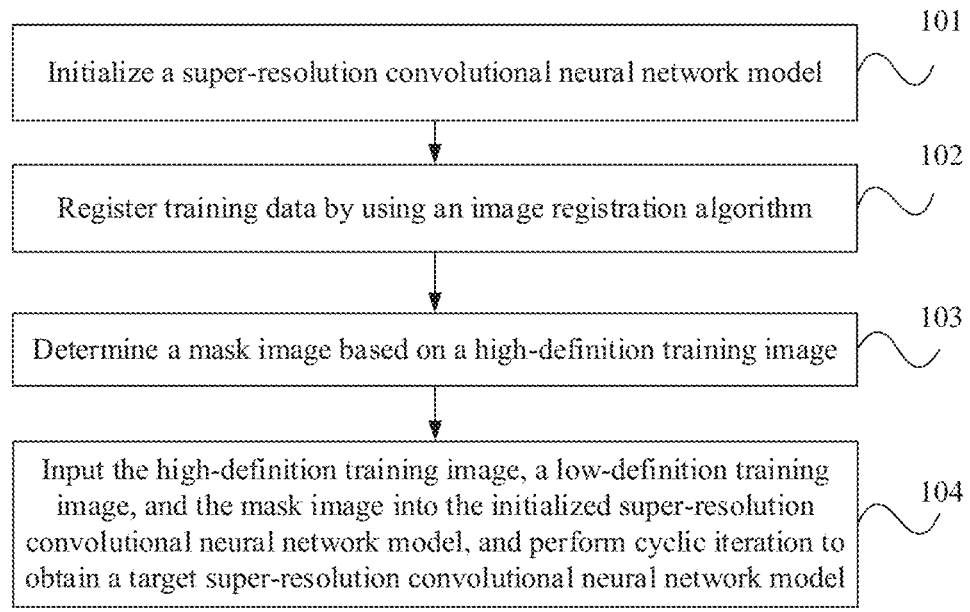
FIG. 4 is a flowchart of a training method for a super-resolution convolutional neural network model according to this application.
Figure 5:
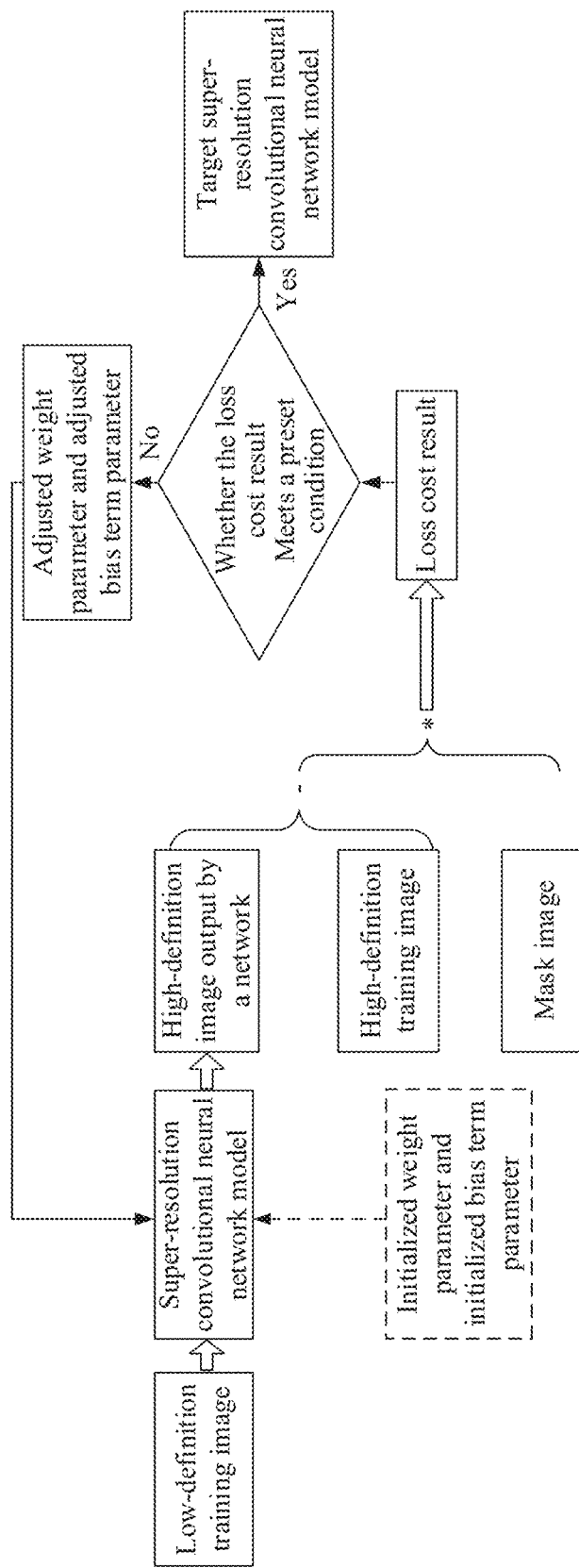
FIG. 5 is a schematic diagram of a model training process according to this application.
Figure 6:
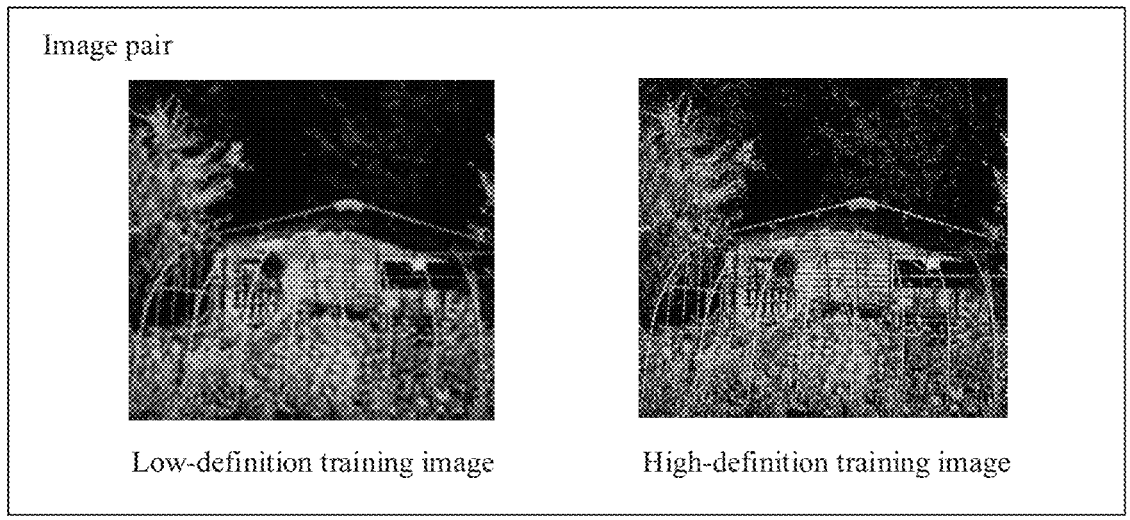
FIG. 6 is a schematic diagram of an image pair according to this application.

FIG. 4 is a flowchart of a training method for a super-resolution convolutional neural network model according to this application. FIG. 5 is a schematic diagram of a model training process according to this application. FIG. 6 is a schematic diagram of an image pair according to this application. This embodiment may be executed by a processor 301 of a training server. As shown in FIG. 4, the training method for the super-resolution convolutional neural network model according to this application may include the following steps.

Step 101: Initialize the super-resolution convolutional neural network model.

A weight parameter and a bias term parameter of the super-resolution convolutional neural network model may be initialized by using a initialization method in the prior art, for example, Gaussian function initialization in the prior art, and examples are not described one by one herein.

For example, as shown in FIG. 5, the super-resolution convolutional neural network model is set by using a initialized weight parameter and an initialized bias term parameter. For example, the initialized weight parameter ad the initialized bias term parameter may be my value in a rage of [0.1]. To be specific, the weight parameter and the bin term parameter of the super-resolution convolutional neural network model are assigned as the initialized weight parameter and the initialized bias term parameter.

Step 102: Register training data by using an image registration algorithm.

Specifically, the image registration algorithm may be a speeded-up robust feature (Speeded Up Robust Features, SURF) algorithm, or may be another image registration algorithm Examples we not described one by one herein.

A one-to-one correspondence between pixels of a high-definition training image and pixels of a low-definition training image may be completed by using the image registration algorithm, in other words, a one-to-one correspondence between the high-definition training image and the low-definition training image is established.

An example in which the plurality of magnifications include m zoom magnifications $\{N_1, N_2, \ldots, N_m\}$ is used for further description. The training data includes m+1 images. Based on the image registration algorithm, an image whose photographing distance is equal to $N_1$ meters ad hose digital zoom magnification is equal to $N_1$ and en image whose photographing distance is equal to 1 meter and whose optical zoom magnification is equal to 1 form a image pair, an image whose photographing distance is equal to $N_2$ meters ad whose digital zoom magnification is equal to $N_2$ and the image whose photographing distance is equal to 1 meter and whose optical zoom magnification is equal to 1 form a image pair, and by analogy, an image whose photographing distance is equal to $N_m$ meters and whose digital zoom magnification is equal to $N_m$ and an image whose photographing distance is equal to 1 meter and whose zoom magnification is equal to 1 form a image pair. Each image pair is training data. In other words, the training data is registered by using the image registration algorithm, to obtain an image pairs. Each image pair includes one high-definition training image and one low-definition training image. In this embodiment, an example in which each image pair uses the image whose photographing distance is equal to 1 meter and whose optical zoom magnification is equal to 1 as the high-definition training image is used for description. Using $N_2=3$ as an example for description, as shown in FIG. 6, a image pair including an image whose photographing distance is equal to 3 meters and whose digital zoom magnification is equal to 3 and an image whose photographing distance is equal to 1 meter and whose optical zoom magnification is equal to 1 in a same house has a same field of view but different definition, wherein the image whose photographing distance is equal to 3 meters and whose digital zoom magnification is equal to 3 is a low-definition training image, mad the image whose photographing distance is equal to 1 meter and whose optical zoom magnification is equal to 1 is a high-definition training image. By learning the training data in the following steps, the weight parameter and the bias term parameter of the model in the step 101 are adjusted, so that an output of the neural network model is close to a target value as much a possible. The target value may specifically be the high-definition training image shown in FIG. 6.

Step 103: Determine a mask image based on the high-definition training image.

Specifically, one or more as of interest in the high-definition training image are extracted, and different weights are separately assigned to the one or more areas of interest and the other areas, to generate a mask image that has a same size as the high-definition training image. Weights of a plurality of areas of interest may be the same or different.

An example in which the size of the high-definition training image is 4000×3000 is used for description, where 4000 specifically refers to a width, and 3000 specifically refers to a height. The high-definition training image has 4000×3000 pixels, and a grayscale value or a brightness value of each pixel of the high-definition training image is obtained. One or more types of areas of interest in the high-definition training image are extracted by using a high-frequency extraction algorithm, a face detection algorithm, or a image segmentation algorithm. The area of interest may be high-frequency information of the image, for example, details and a contour of the image. The contour is used as an example for description. An area in which a pixel corresponding to the contour is located is u area of interest. The size of the generated mask image is also 4000×3000. A weight value is stored in a location that is in the mask image and that is corresponding to a pixel of the high-definition training image. Weight values of different locations in the mask image may be the same or may be different. Weights of same as may be the same, and weights of different areas may be different.

A weight of the a of interest is greater than that of another area, and a weight value may be flexibly set according to a requirement. The weight of the area of interest is greater than that of the another area, to ensure a learning rate of the a of interest. For example, the weight of the area of interest is 1, and the weight of the another area is 0.

In a implementation, high-frequency information in the high-definition training image is extracted by using the high-frequency extraction algorithm, and the high-frequency information is used as the area of interest. In another implementation, face information in the high-definition training image is extracted by using the face detection algorithm, and the face information is used as the area of interest. In still another implementation, different objects are extracted as different areas of interest by using the image segmentation algorithm.

An area (for example, an image edge) in which the high-frequency information is located is used as the area of interest. The following step 104 may improve a learning rate of the area (for example, the image edge) in which the high-frequency information is located, so that an edge of a output image of a target super-resolution convolutional neural network model is sharper, and user subjective perception is good. However, the following step 104 may improve a learning rate of an area (a flat area, noise, or the like) in which low-frequency information is located, so that there is no obvious noise amplification for the output image of the target super-resolution convolutional neural network model, to implement noise equalization.

Optionally, in a specific implementation of the step 103, Gaussian blur processing is performed on the high-definition training image to obtain a blurred image blur, a difference between the high-definition training image and the blurred image blur is calculated, to obtain a difference image diff, and binarization processing is performed on the difference image diff to obtain the mask image.

In this embodiment, the step 104 is separately performed on the an image pain. For example, when the step 104 is performed for the first time, the low-definition training image is a image whose photographing distance is equal to $N_1$ meters and whose digital zoom magnification is equal to $N_1$; and when the step 104 is performed for the second time, the low-definition training image is a image whose photographing distance is equal to $N_2$ meters ad whose digital zoom magnification is equal to $N_2$. The other image pairs are processed in a same manner, and details are not described herein again. Each time the step 104 is performed, the high-definition training image is an image whose photographing distance is equal to 1 meter and whose optical zoom magnification is equal to 1.

Step 104: Input the high-definition training image, the low-definition training image, and the mask image into the initialized super-resolution convolutional neural network model, and perform cyclic iteration to obtain the target super-resolution convolutional neural network model.

A specific implementation may be as follows: As shown in FIG. 5, the low-definition training image is processed by the super-resolution convolutional neural network model in the step 101, to output a high-definition image output by a network. Specifically, the processing performed by the super-resolution convolutional neural network model in the step 101 includes an operation between the low-definition training image and the initialized weight parameter and/or the initialized bias term parameter. Specifically, the operation is related to a structure of the super-resolution convolutional neural network model, and may be flexibly set according to a requirement, to obtain the high-definition image output by the network. An operation is performed on the high-definition image output by the network, the high-definition training image, and the mask image, to obtain a loss cost result. The super-resolution convolutional neural network model in the step 101 is adjusted based on the loss cost result. For example, a preset condition that the loss cost result meets may be set. In an implementation, the preset condition may be that the loss cost result is less than a loss cost result of a previous iteration. If the loss cost result does not meet the preset condition, the weight parameter and the bias term parameter may be adjusted, and the super-resolution convolutional neural network model in the step 101 is updated by using a adjusted weight parameter and a adjusted bias term parameter. The processing on the low-definition training image is repeated by using an adjusted super-resolution convolutional neural network model, to further calculate a new loss cost result, and determine whether the new loss cost result meets the preset condition. In this way, iteration is performed repeatedly until the new loss cost result meets the preset condition, to obtain the target super-resolution convolutional neural network model.

As shown in FIG. 5, the loss cost result may be calculated by subtracting a grayscale value of each pixel of the high-definition image output by the network from a grayscale value of a pixel at a corresponding location of the high-definition training image, mad then multiplying by a value of a corresponding location in the mask image, where the grayscale value may be replaced with a brightness value. The loss cost result may alternatively be calculated by performing another operation according to a requirement, and examples are not illustrated one by one herein.

For example, the loss cost result is calculated by using a formula (1).

$$\text{Loss} = \frac{1}{2} \Sigma_{l=1}^{L} y_{mask} \| y_{train_{hr}} - y_{nn\_hr} \|_2^2 \qquad (1)$$

In the formula, L is a pixel quantity, $y_{mask}$ is a weight of the mask image, $y_{train_{hr}}$ is a grayscale value or a brightness value of a pixel of the high-definition training image, $y_{nn\_hr}$ is the grayscale value or the brightness value of the high-definition image output by the network, $\| \|_2^2$ represents a square of a 2-norm, a subscript 2 represents the 2-norm, and a superscript 2 represents a square. In other words, 1 to L are traversed by using l in the formula (1), and each pixel is calculated to obtain the loss cost result.

It should be noted that the foregoing steps in this embodiment are described by using the plurality of magnifications as an example. When the super-resolution convolutional neural network model is a single-magnification super-resolution convolutional neural network model, for example, an N-magnification super-resolution convolutional neural network model, the step 103 and the step 104 may be performed for one image pair. For example, when the step 103 and the step 104 are performed, the high-definition training image is an image whose photographing distance is equal to 1 meter and whose optical zoom magnification is equal to 1, and the low-definition training image is an image whose photographing distance is equal to N meters and whose digital zoom magnification is equal to N.

The foregoing steps in this embodiment are described by using one group of training data u example. It may be understood that a plurality of groups of training data may be used to perform the step 102 to the step 104, to adjust the super-resolution convolutional neural network model based on the plurality of groups of training data, so that an image processing effect of the obtained target super-resolution convolutional neural network model can be improved. For example, one group of training data is obtained by photographing a human scenario, and the other group of training data is obtained by photographing a lake scenario. In this case, the step 102 to the step 104 are performed by using the two groups of training data, to obtain the target super-resolution convolutional neural network model, so that an effect of processing images of different scenarios by the target super-resolution convolutional neural network model can be improved.

In this embodiment, the super-resolution convolutional neural network model is initialized by inputting the high-definition training image, the low-definition training image, and the mask image, so that the initialized super-resolution convolutional neural network model may adjust the model by continuously learning based on the high-definition training image, the low-definition training image, and the mask image, to obtain the target super-resolution convolutional neural network model. In a learning process, because the mask image is input, the weight of the area of interest is relatively high, and the loss cost result is greatly affected. Therefore, the learning rate of the area of interest can be improved, and a learning rate of the other areas can be reduced, to effectively improve the image processing effect of the obtained target super-resolution convolutional neural network model. The target super-resolution convolutional neural network model is applied to a model application device, to improve definition of a zoomed image output by the model application device.

To clearly understand this embodiment of this application, the following specifically explains and describes how to improve the learning rate of the area of interest and reduce the learning rate of the other areas. An example in which a weight of an area of interest in the mask image is and a weight of the other areas is 0 is used for description. Each pixel value of the high-definition image output by the network is subtracted from a pixel value of a corresponding location in the high-definition training image, and then is multiplied by a value of a corresponding location in the mask image. Because the weight of the ea of interest is 1 and the weight of the other areas is 0, the loss cost result is completely determined by the areas of interest. When the loss cost result does not meet a condition, a parameter of the initialized super-resolution convolutional neural network model is adjusted, so that a loss cost result calculated based on the mask image meets the condition. During model adjustment, namely, learning, only the area of interest is learned. It can be learned that learning rates of the model in different areas vary with different weights of different areas of the mask image.

(4) Model Application

This application further provide a model application device. The model application device may use a structure that is the same as that shown in FIG. 2. The model application device stores the target super-resolution convolutional neural network model described in the foregoing embodiment of this application. Specifically, the target super-resolution convolutional neural network model may be stored in a memory of the model application device in a form of a file, a program, an instruction, or the like. When the model application device is in a photographing mode and triggers a digital zoom function of a camera, a processor of the model application device invoke the target super-resolution convolutional neural network model in the memory to process image photographed by a camera of the model application device, to obtain a output image, and display the output image on a touchscreen of the model application device.

Specifically, the touchscreen of the model application device receives a triggering operation for enabling the camera, and sends instruction corresponding to the triggering operation to the processor of the model application device. In response to the instruction, the processor enables a came application, where the enabling the camera application includes enabling the camera and displaying a camera operation screen on the touchscreen, and the camera operation screen may include an image collected by the camera, and may further include controls such as a zoom button. It may be understood that, after the camera application is enabled, if the touchscreen is displaying a photographing screen, the camera may continuously collect images, the touchscreen may display these continuously collected images, and the images collected by the camera are to-be-zoomed images. Optionally, the camera may start to collect an image after a zoom function is enabled, and the touchscreen displays the to-be-zoomed images.

The touchscreen of the model application device receives a triggering operation for enabling the zoom function, and sends, to the processor of the model application device, an instruction corresponding to triggering operation for enabling the zoom faction. In a implementation, in response to the instruction corresponding to the triggering operation for enabling the zoom faction, the processor determines a target zoom magnification based on the triggering operation for enabling the zoom function, and enables the zoom function corresponding to the target zoom magnification. In this implementation, for example, the triggering operation for enabling the zoom function may be a two-finger swipe gesture for zooming in a currently displayed image on the camera operation screen, a gesture for pressing the zoom button, or the like. This is not limited in this embodiment of this application. In another implementation, in response to the instruction corresponding to the triggering operation for enabling the zoom function, the processor adds a zoom function screen to the camera operation screen, and the touchscreen displays the zoom function screen that is, for example, a slider bar indicating a zoom multiple. The touchscreen receives a selection input of a user on the zoom function screen, md the processor determine the target zoom magnification based on the input, and enables the zoom function corresponding to the target zoom magnification. It may be understood that the target zoom magnification is usually greater than 1.

In some implementations, the model application device has an optical zoom function. For example, a maximum optical zoom magnification of the model application device is 2.

When the target zoom magnification is less than the maxim optical zoom magnification of the model application device, the to-be-zoomed images may be processed by using optical zoom, to obtain processed images corresponding to the target zoom magnification. For details, refer to a related implementation in the prior art. When the target zoom magnification is equal to the maximum optical zoom magnification of the model application device, the to-be-zoomed images may be processed by using optical zoom or digital zoom.

When the target zoom magnification is greater than the maximum optical zoom magnification of the model application device, the to-be-zoomed images may be processed by using digital zoom, to obtain processed images corresponding to the target zoom magnification. For example, the processor collects a to-be-processed image based on the target zoom magnification, processes the to-be-processed image by using the target super-resolution convolutional neural network model, to obtain a processed image corresponding to the target zoom magnification, and displays the processed image on the touchscreen of the model application device. When the target zoom magnification is greater than the maximum optical zoom magnification of the model application device, enabling the zoom function corresponding to the target zoom magnification may be understood as enabling a digital zoom function corresponding to a magnification.

In some other implementations, the model application device does not have the optical zoom function. After the target zoom magnification is determined, the target super-resolution convolutional neural network model may be directly used to perform digital zoom on a to-be-processed image, to obtain a processed image corresponding to the target zoom magnification. Specifically, the processor collects the to-be-processed image based on the target zoom magnification, and processes the to-be-processed image by using the target super-resolution convolutional neural network model, to obtain the processed image corresponding to the target zoom magnification, and the touchscreen of the model application device displays the processed image.

Optionally, the touchscreen may further receive a photographing instruction used for performing inputting by the user by using the camera operation screen or a hardware photographing button, and the processor saves the processed image in the memory in response to the photographing instruction. Some information such as a photographing time point and a photographing location may be saved.

After the model training, the model application device is set by using the obtained target super-resolution convolutional neural network model.

In an implementation, after the model training, a target super-resolution convolutional neural network model that has a plurality of single magnifications is obtained. The plurality of single magnifications may include $\{N_1, N_2, \ldots, N_m\}$, where m is a positive integer greater than 1, and a value range of each of m zoom magnifications is the same a that of N, and different zoom magnifications have different values. In this cue, some or all of target super-resolution convolutional neural network models may be selected to set the model application device bed on a device hardware condition or a use requirement of the model application device. The following uses a example in which a plurality of obtained single magnifications include {1, 2, . . . , 10} for description. In implementation, a target super-resolution convolutional neural network model that has a even-multiple zoom magnification greater than 1 and less than 10 may be set in the model application device, for example, a target super-resolution convolutional neural network model that has a 2× zoom magnification, a target super-resolution convolutional neural network model that has a 4× zoom magnification, a target super-resolution convolutional neural network model that has a 6× zoom magnification, a target super-resolution convolutional neural network model that has a 8× zoom magnification, and a target super-resolution convolutional neural network model that has an 10× zoom magnification may be set in the model application device. In another implementation, a target super-resolution convolutional neural network model that has odd-multiple zoom magnification greater than 2 and less then 10 may be set in the model application device. For example, a target super-resolution convolutional neural network model that has a 3× zoom magnification, a target super-resolution convolutional neural network model that has a 5× zoom magnification, a target super-resolution convolutional neural network model that has a 7× zoom magnification, and a target super-resolution convolutional neural network model that has a 9× zoom magnification may be set in the model application device. In n implementation, a target super-resolution convolutional neural network model that ha an integer-multiple zoom magnification greater than an and less than or equal to 10 may be set.

The target zoom magnification may be represented by X, and a value of the target zoom magnification X may be any value greater than 1, including a integer and a decimal.

The following describes a specific operation of the processor of the model application device when the target zoom magnification X is greater than the maximum optical zoom magnification of the model application device (in other words, a digital zoom mode is entered).

The processor collects a to-be-processed image based on the target zoom magnification X. When the value of X is a integer, the processor of the model application device determines whether a target super-resolution convolutional neural network model that has an X zoom magnification is set in the model application device. If there is a target super-resolution convolutional neural network model that has the X zoom magnification, the processor processes the to-be-processed image by using the target super-resolution convolutional neural network model that has the X zoom magnification, and outputs a processed image. If there is not a target super-resolution convolutional neural network model that has the X zoom magnification, the processor processes the to-be-processed image by using a target super-resolution convolutional neural network model that has a Y zoom magnification, to obtain en intermediate result, where Y is a maximum zoom magnification that is less than X and that is in the model application device; and then the processor performs (X-Y)× zoom on the intermediate result by using a non-learning linear interpolation algorithm in the prior art, to output a processed image. The following uses X=4 and Y=3 as an example for description. The processor processes the to-be-processed image by using the target super-resolution convolutional neural network model that has a 3× zoom magnification, to obtain an intermediate result, and then performs 1× zoom on the intermediate result by using the non-learning linear interpolation algorithm in the prior art, to output a processed image.

When the value of X is a decimal, the processor of the model application device rounds X down ($\lfloor X \rfloor$), to determine whether a target super-resolution convolutional neural network model that has a $\lfloor X \rfloor$ zoom magnification is set in the model application device. If there is a target super-resolution convolutional neural network model that has a $\lfloor X \rfloor$ zoom magnification, the processor processes the to-be-processed image by using the target super-resolution convolutional neural network model that has the $\lfloor X \rfloor$ zoom magnification, to obtain an intermediate result, and then the processor performs (X-$\lfloor X \rfloor$)× zoom on the intermediate result by using the non-learning linear interpolation algorithm in the prior art, to output a processed image. If them is not a target super-resolution convolutional neural network model that has a $\lfloor X \rfloor$ zoom magnification, the processor processes the to-be-processed image by using a target super-resolution convolutional neural network model that has a Y zoom magnification, to obtain an intermediate result, where Y is a maximum zoom magnification that is less than X and that is in the model application device; and then the processor performs (X-Y)× zoom on the intermediate result by using the non-learning linear interpolation algorithm in the prior art, to output a processed image. The following uses X=4.5 and Y=3 as an example for description. The processor processes the to-be-processed image by using the target super-resolution convolutional neural network model that has a 3× zoom magnification, to obtain an intermediate result, and then performs 1.5× zoom on the intermediate result by using the non-leaning linear interpolation algorithm in the prior art, to output a processed image.

It should be noted that a lager quantity of target super-resolution convolutional neural network models that have different zoom magnifications and that are stored in the model application device indicates higher definition of a zoned image output by the model application device, and a smaller quantity of the target super-resolution convolutional neural network models that have different zoom magnifications and that are stored in the model application device indicates more storage space saved in the model application device. This may be flexibly set according to a requirement.

It may be understood that, after the model training, the obtained target super-resolution convolutional neural network model is a multi-magnification target super-resolution convolutional neural network model, and the target super-resolution convolutional neural network model may be set in the model application device. The target super-resolution convolutional neural network model supports a plurality of different zoom magnifications. When the target zoom magnification X is greater then the maximum optical zoom magnification of the model application device, specific operations of the processor of the model application device may include: determining whether the plurality of magnifications include the target zoom magnification X; and if the plurality of magnifications include the target zoom magnification X, inputting the to-be-processed image into the target super-resolution convolutional neural network model, and processing the to-be-processed image by using the target super-resolution convolutional neural network model, to output a processed image; or if the plurality of magnifications do not include the target zoom magnification X, processing the to-be-processed image by using the target super-resolution convolutional neural network model, to obtain an intermediate result, and performing (X-Z)× zoom on the intermediate result by using a linear interpolation algorithm, to output a processed image, where X is the target zoom magnification, and Z is a maximum zoom magnification that is less than X and that is in the plurality of magnifications.

It may be understood that the model application device may further perform other processing other the zooming on a image collected by a camera. This is not limited in this application.

Figure 7:
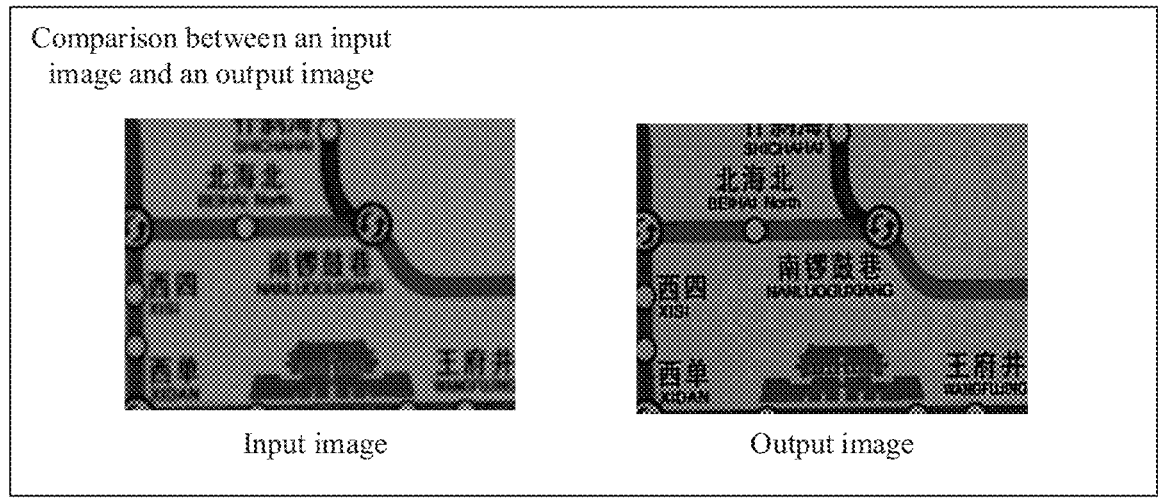
FIG. 7 is a schematic diagram of comparison between an input image and a output image of a model application device according to this application.

FIG. 7 is a schematic diagram of a comparison between an input image and an output image of a model application device according to this application. As shown in FIG. 7, the input image is a to-be-processed image in this embodiment, and the to-be-processed image may not be displayed but is only used a an image processed inside a terminal. The input image has low definition. The output image is a processed image in this embodiment, and the terminal displays the processed image after digital zoom is enabled. The output picture has high definition. It can be learned that, processing performed by a target super-resolution convolutional neural network model in this application can effectively improve definition of a zoomed image of the model application device. In this embodiment, the model application device uses the target super-resolution convolutional neural network model to process the to-be-processed image, to output the processed image. Because the target super-resolution convolutional neural network model is obtained by performing model adjustment by continuously learning based on the high-definition training image, the low-definition training image, and the mask image, definition of a zoomed image output by the model application device can be improved, to overcome image quality deterioration problems such as definition decrease and noise amplification that are caused by conventional digital zoom.

It should be noted that the model application device in this application may also complete the processes of image collection and model training that are described in the foregoing embodiments. In other words, the model application device may also be used as an image collection device to collect a training image, and used as a training server to train a super-resolution convolutional neural network model. For a specific implementation of the model application device, refer to the descriptions in the foregoing embodiments. Details are not described herein again.

Finally, it should be noted that the foregoing embodiments are merely intended for describing the technical solutions of this application other than limiting this application. Although this application is described in detail with reference to the foregoing embodiments, persons of ordinary skill in the at should understand that they may still make modifications to the technical solutions described in the foregoing embodiments or make equivalent replacements to some or all technical features thereof, without departing from the scope of the technical solutions of the embodiments of this application.

What is claimed is:

1. An image processing method implemented by a terminal, comprising:
   training a super-resolution convolutional neural network model using a high-definition training image, a low-definition training image, and a mask image to obtain a first target super-resolution convolutional neural network model;
   enabling a photographing function of the terminal;
   enabling a zoom function of the terminal;
   receiving a selection input of a user;
   determining a target zoom magnification based on the selection input;
   collecting a to-be-processed image;
   processing the to-be-processed image using the first target super-resolution convolutional neural network model to obtain a processed image corresponding to the target zoom magnification by:
   identifying that the target zoom magnification is greater than a maximum optical zoom magnification of the terminal; and
   processing, in response to the identifying, the to-be-processed image using the first target super-resolution convolutional neural network model; and
   displaying the processed image.

2. The image processing method of claim 1, further comprising storing a second target super-resolution convolutional neural network model single magnification, and wherein processing the to-be-processed image further comprises:
   determining whether the second target super-resolution convolutional neural network model single magnification is equal to the target zoom magnification; and either:
- processing the to-be-processed image using a second target super-resolution convolutional neural network model and outputting the processed image when the second target super-resolution convolutional neural network model single magnification is equal to the target zoom magnification; or
- processing the to-be-processed image using a Y-magnification target super-resolution convolutional neural network model to obtain an intermediate result and performing (X-Y)x zoom on the intermediate result using a linear interpolation algorithm to output the processed image when the second target super-resolution convolutional neural network model single magnification does not equal to the target zoom magnification, wherein X is the target zoom magnification, and wherein Y is a maximum zoom magnification that is less than X and that is in the second target super-resolution convolutional neural network model single magnification.

3. The image processing method of claim 1, further comprising storing a second target super-resolution convolutional neural network model comprising a plurality of magnifications, and wherein processing the to-be-processed image further comprises:
- determining whether the magnifications comprise the target zoom magnification; and
- either:
  - inputting the to-be-processed image into the second target super-resolution convolutional neural network model and processing the to-be-processed image using the second target super-resolution convolutional neural network model to output the processed image when the magnifications comprise the target zoom magnification; or
  - processing the to-be-processed image using the second target super-resolution convolutional neural network model to obtain an intermediate result and performing (X-Z)x zoom on the intermediate result using a linear interpolation algorithm to output the processed image when the magnifications do not comprise the target zoom magnification, wherein X is the target zoom magnification, and wherein Z is a maximum zoom magnification that is less than X and that is in the magnifications.

4. The image processing method of claim 1, further comprising:
- constructing, using an image registration algorithm, a training image pair of the high-definition training image and the low-definition training image that are photographed for a same scenario;
- extracting an area of interest in the high-definition training image according to a preset rule;
- assigning a first weight to the area of interest and a second weight to a second area in the high-definition training image to generate the mask image comprising a same size as the high-definition training image;
- inputting the high-definition training image, the low-definition training image, and the mask image into the super-resolution convolutional neural network model;
- calculating a loss cost result in each of the area of interest and the second area based on the first weight and the second weight; and
- obtaining the first target super-resolution convolutional neural network model based on the loss cost result.

5. The image processing method of claim 4, wherein obtaining the first target super-resolution convolutional neural network model based on the loss cost result further comprises:
- determining whether the loss cost result meets a preset condition; and
- either:
  - adjusting the super-resolution convolutional neural network model until an adjusted super-resolution convolutional neural network model meets the preset condition to obtain the first target super-resolution convolutional neural network model when the loss cost result does not meet the preset condition; or
  - setting the super-resolution convolutional neural network model as the first target super-resolution convolutional neural network model when the loss cost result meets the preset condition.

6. The image processing method of claim 4, wherein extracting the area of interest in the high-definition training image further comprises:
- extracting high-frequency information in the high-definition training image using a high-frequency extraction algorithm and setting an area in which the high-frequency information is located as the area of interest;
- extracting face information in the high-definition training image using a face detection algorithm and setting the face information as the area of interest; or
- extracting different objects as the area of interest using an image segmentation algorithm.

7. The image processing method of claim 4, wherein extracting the area of interest in the high-definition training image further comprises:
- extracting high-frequency information in the high-definition training image using a high-frequency extraction algorithm; and
- setting an area in which the high-frequency information is located as the area of interest.

8. The image processing method of claim 4, wherein extracting the area of interest in the high-definition training image further comprises extracting face information in the high-definition training image using a face detection algorithm and setting the face information as the area of interest.

9. The image processing method of claim 4, wherein extracting the area of interest in the high-definition training image further comprises extracting different objects as the area of interest using an image segmentation algorithm.

10. The image processing method of claim 1, further comprising:
- receiving a photographing command from the user using a camera operation screen or a hardware photographing button; and
- storing, in response to the photographing command, the processed image in a memory of the terminal.

11. An image processing method, comprising:
- photographing a high-definition training image and a low-definition training image for a same scenario;
- extracting an area of interest in the high-definition training image according to a preset rule;
- assigning a first weight to the area of interest and a second weight to a second area in the high-definition training image to generate a mask image comprising a same size as the high-definition training image; and
- training a super-resolution convolutional neural network model using the high-definition training image, the low-definition training image, and the mask image to generate a target super-resolution convolutional neural network model by:

inputting the high-definition training image, the low-definition training image, and the mask image into the super-resolution convolutional neural network model;
calculating a loss cost result in each of the area of interest and the second area based on the first weight and the second weight; and
obtaining the target super-resolution convolutional neural network model based on the loss cost result.

12. The image processing method of claim 11, wherein extracting the area of interest in the high-definition training image further comprises:
extracting high-frequency information in the high-definition training image using a high-frequency extraction algorithm and setting an area in which the high-frequency information is located as the area of interest;
extracting face information in the high-definition training image using a face detection algorithm and setting the face information as the area of interest; or
extracting different objects as different areas of interest using an image segmentation algorithm.

13. The image processing method of claim 12, wherein inputting the high-definition training image, the low-definition training image, and the mask image into the super-resolution convolutional neural network model, calculating the loss cost result in each area, and obtaining the target super-resolution convolutional neural network model further comprises:
processing the low-definition training image using the super-resolution convolutional neural network model to obtain a high-definition image of a network;
performing an operation on the high-definition training image, the high-definition image, and the mask image to calculate a second loss cost result; and
obtaining the target super-resolution convolutional neural network model based on the second loss cost result.

14. The image processing method of claim 13, wherein obtaining the target super-resolution convolutional neural network model based on the second loss cost result further comprises:
determining whether the second loss cost result meets a preset condition; and
either:
adjusting the super-resolution convolutional neural network model until an adjusted super-resolution convolutional neural network model meets the preset condition to obtain the target super-resolution convolutional neural network model when the second loss cost result does not meet the preset condition; or
setting the super-resolution convolutional neural network model as the target super-resolution convolutional neural network model when the second loss cost result meets the preset condition.

15. The image processing method of claim 13, wherein performing the operation on the high-definition training image, the high-definition image, and the mask image further comprises:
obtaining the second loss cost result according to a formula $$\text{Loss} = \tfrac{1}{2} \Sigma_{l=1}^{L} y_{mask} \| y_{train_{hr}} - y_{nn\_hr} \|_2^2,$$

wherein Loss is the second loss cost result, wherein L is a pixel quantity, wherein $y_{mask}$ is a third weight of the mask image, wherein $y_{train_{hr}}$ is a grayscale value or a brightness value of a pixel of the high-definition training image, and wherein $y_{nn\_hr}$ is a grayscale value or a brightness value of the high-definition image.

16. The image processing method of claim 11, further comprising registering the high-definition training image and the low-definition training image using an image registration algorithm to establish a one-to-one correspondence between the high-definition training image and the low-definition training image.

17. A terminal, comprising:
a camera configured to photograph an image;
a memory configured to store instructions; and
a processor coupled to the camera and the memory and configured to execute the instructions to cause the terminal to:
train a super-resolution convolutional neural network model using a high-definition training image, a low-definition training image, and a mask image to obtain a first target super-resolution convolutional neural network model;
enable a photographing function of the terminal;
enable a zoom function of the terminal;
receive a selection input of a user;
determine a target zoom magnification based on the selection input;
collect a to-be-processed image;
process the to-be-processed image using the first target super-resolution convolutional neural network model to obtain a processed image corresponding to the target zoom magnification;
display the processed image;
construct, using an image registration algorithm, a training image pair of the high-definition training image and the low-definition training image that are photographed for a same scenario;
extract an area of interest in the high-definition training image according to a preset rule;
assign a first weight to the area of interest and a second weight to a second area in the high-definition training image to generate the mask image comprising a same size as the high-definition training image;
input the high-definition training image, the low-definition training image, and the mask image into the super-resolution convolutional neural network model;
calculate a loss cost result in each of the area of interest and the second area based on the first weight and the second weight; and
obtain the first target super-resolution convolutional neural network model based on the loss cost result.

18. The terminal of claim 17, wherein the memory is further configured to store a second target super-resolution convolutional neural network model comprising a single magnification, and wherein the instructions further cause the terminal to:
determine whether the single magnification is equal to the target zoom magnification; and
either:
process the to-be-processed image using the second target super-resolution convolutional neural network model and output the processed image when the single magnification is equal to the target zoom magnification; or
process the to-be-processed image using a Y-magnification target super-resolution convolutional neural network model to obtain an intermediate result and perform (X-Y)x zoom on the intermediate result using a linear interpolation algorithm to output the processed image when the single magnification does not equal to the target zoom magnification, wherein X is the target zoom magnification, and wherein Y is a maximum zoom magnification that is less than X and that is in the single magnification.

19. The terminal of claim 17, wherein the memory is further configured to store a second target super-resolution convolutional neural network model comprising a plurality of magnifications, and wherein the instructions further cause the terminal to:
- determine whether the magnifications comprise the target zoom magnification; and
- either:
  - input the to-be-processed image into the second target super-resolution convolutional neural network model and process the to-be-processed image using the second target super-resolution convolutional neural network model to output the processed image when the magnifications comprise the target zoom magnification; or
  - process the to-be-processed image using the second target super-resolution convolutional neural network model to obtain an intermediate result and perform (X-Z)x zoom on the intermediate result using a linear interpolation algorithm to output the processed image when the magnifications do not comprise the target zoom magnification, wherein X is the target zoom magnification, and wherein Z is a maximum zoom magnification that is less than X and that is in the magnifications.

20. The terminal of claim 17, wherein the instructions further cause the terminal to:
- determine whether the loss cost result meets a preset condition; and
- either:
  - adjust the super-resolution convolutional neural network model until an adjusted super-resolution convolutional neural network model meets the preset condition to obtain the first target super-resolution convolutional neural network model when the loss cost result does not meet the preset condition; or
  - set the super-resolution convolutional neural network model as the first target super-resolution convolutional neural network model when the loss cost result meets the preset condition.

\* \* \* \* \*